(12) United States Patent
Asahara et al.

(10) Patent No.: US 11,927,195 B2
(45) Date of Patent: Mar. 12, 2024

(54) SEALING DEVICE, ROTARY MACHINE, AND DESIGN METHOD FOR SEALING DEVICE PRELIMINARY CLASS

(71) Applicant: MITSUBISHI HEAVY INDUSTRIES, LTD., Tokyo (JP)

(72) Inventors: Motomu Asahara, Tokyo (JP); Naoto Omura, Tokyo (JP); Makoto Iwasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/161,542

(22) Filed: Jan. 30, 2023

(65) Prior Publication Data
US 2023/0287894 A1 Sep. 14, 2023

(30) Foreign Application Priority Data
Mar. 14, 2022 (JP) .................................. 2022-039646

(51) Int. Cl.
*F04D 29/10* (2006.01)
*F16J 15/40* (2006.01)
(52) U.S. Cl.
CPC ............ *F04D 29/102* (2013.01); *F16J 15/40* (2013.01)

(58) Field of Classification Search
CPC .... F04D 29/102; F04D 17/122; F04D 29/122; F04D 29/20; F16J 15/44–15/453; F16J 15/40; F16J 15/54; F05D 2250/60
See application file for complete search history.

(56) References Cited

U.S. PATENT DOCUMENTS

| 10,066,750 B2 * | 9/2018 | Nakaniwa | ............ F16J 15/4472 |
| 2015/0267710 A1 * | 9/2015 | Nagai | .................. F04D 17/122 |
| | | | 415/170.1 |
| 2017/0241427 A1 * | 8/2017 | Nakaniwa | ............... F16J 15/444 |
| 2019/0264812 A1 * | 8/2019 | Ootani | .................... F16J 15/102 |

FOREIGN PATENT DOCUMENTS

| JP | 2014-109263 A | 6/2014 | |
| WO | WO-2017013922 A1 * | 1/2017 | ............ F16J 15/447 |
| WO | WO-2017110613 A1 * | 6/2017 | |

* cited by examiner

*Primary Examiner* — Juan G Flores
*Assistant Examiner* — Eric A Lange
(74) *Attorney, Agent, or Firm* — Birch, Stewart, Kolasch & Birch, LLP (57) ABSTRACT

A sealing device includes a sealing main body surrounding a rotor shaft rotating about an axis from an outer periphery side. The sealing main body includes an inside surface facing an outside surface of the rotor shaft with clearance and a plurality of hole parts formed recessed to an outer side in a radial direction from the inside surface and arrayed in a circumferential direction of the inside surface and in a direction of the axis. The hole parts have an inner peripheral wall in which a spiral groove extending twisting toward the outer side in a radial direction is formed.

5 Claims, 9 Drawing Sheets

SEALING DEVICE, ROTARY MACHINE, AND DESIGN METHOD FOR SEALING DEVICE PRELIMINARY CLASS

CROSS-REFERENCE TO RELATED APPLICATIONS

This application claims the benefit of priority to Japanese Patent Application Number 2022-039646 filed on Mar. 14, 2022. The entire contents of the above-identified application are hereby incorporated by reference.

TECHNICAL FIELD

The disclosure relates to a sealing device, a rotary machine, and a design method for the sealing device.

RELATED ART

A fluid rotary machine, such as a centrifugal compressor has clearance between a rotor shaft and a casing covering the rotor shaft from an outer periphery side. The clearance may be provided with a sealing device for reducing generation of a leakage flow of a working fluid from a space on a high-pressure side toward a space on a low-pressure side.

For example, JP 2014-109263 A discloses a hole pattern seal (sealing device) including an annular main body portion in which a plurality of hole parts opening opposite to an outside surface of a rotor shaft is formed. Flowing a working fluid into the plurality of hole parts causes movement of the fluid due to shaft vibration to be reduced, generating a resistance force. This resistance force acts as a damping force, reducing destabilization of the shaft due to an excitation force.

SUMMARY

To reduce a fluid excitation force to be generated by a circumferential pressure distribution, in response to further increase in speed and capacity of future fluid rotary machines, a sealing device having a hole pattern structure having a higher damping force is awaited.

The disclosure has been made to solve the above problem, and an object of the disclosure is to provide a sealing device that can further suppress generation of an excitation force, a rotary machine, and a design method for the sealing device.

To solve the above problem, a sealing device according to the disclosure includes a sealing main body surrounding a rotor shaft rotating about an axis from an outer periphery side. The sealing main body includes an inside surface facing an outside surface of the rotor shaft with clearance and a plurality of hole parts formed recessed to an outer side in a radial direction from the inside surface and arrayed in a circumferential direction of the inside surface and in a direction of the axis. The hole parts have an inner peripheral wall in which a spiral groove extending twisting toward the outer side in a radial direction is formed.

A rotary machine according to the disclosure includes the sealing device, the rotor shaft, and a casing surrounding the rotor shaft from an outer periphery side and supporting the sealing device that separates a high-pressure-side space on one side in the direction of the axis from a low-pressure-side space on the other side in the direction of the axis. The rotor shaft rotates counterclockwise or clockwise about the axis as viewed from the one side in the direction of the axis. The spiral groove extends twisting counterclockwise about a hole part center line extending in a radial direction at a center of each of the hole parts as viewed from an inner side in a radial direction when the rotor shaft rotates counterclockwise. The spiral groove extends twisting clockwise about a hole part center line extending in the radial direction at a center of each of the hole parts as viewed from the inner side in a radial direction when the rotor shaft rotates clockwise.

A rotary machine according to the disclosure includes a sealing device including a sealing main body surrounding a rotor shaft rotating about an axis from an outer periphery side, the rotor shaft, and a casing surrounding the rotor shaft from an outer periphery side and supporting the sealing device that separates a high-pressure-side space on one side in the direction of the axis from a low-pressure-side space on the other side in the direction of the axis. The sealing main body includes an inside surface facing an outside surface of the rotor shaft with clearance and a plurality of hole parts formed recessed to an outer side in a radial direction from the inside surface and arrayed in a circumferential direction of the inside surface and in a direction of the axis. The plurality of hole parts includes a plurality of holes with a groove having an inner peripheral wall in which a spiral groove extending twisting toward the outer side in a radial direction is formed and a plurality of holes without a groove having an inner peripheral wall in which the spiral groove is not formed. A proportion of the plurality of holes with a groove to the plurality of hole parts arrayed in the circumferential direction of the inside surface increases toward the high-pressure-side space side.

A design method for a sealing device according to the disclosure is a method for designing a sealing device including a sealing main body that surrounds a rotor shaft rotating about an axis from an outer periphery side and includes an inside surface facing an outside surface of the rotor shaft with clearance and a plurality of hole parts formed recessed to an outer side in a radial direction from the inside surface and arrayed in a circumferential direction of the inside surface and in a direction of the axis. The design method includes a fluid force distribution acquiring step of acquiring a fluid force distribution of fluid flowing into the clearance from the direction of the axis, a groove forming region determining step of dividing the inside surface into a groove forming region and a non-groove forming region in accordance with the fluid force distribution, a first hole part setting step of disposing, in the groove forming region, the plurality of hole parts having an inner peripheral wall in which a spiral groove extending twisting toward the outer side in a radial direction is formed, and a second hole part setting step of disposing, in the non-groove forming region, the plurality of hole parts having an inner peripheral wall in which the spiral groove is not formed.

The disclosure can provide a sealing device that can further suppress generation of an excitation force, a rotary machine, and a design method for the sealing device.

BRIEF DESCRIPTION OF DRAWINGS

The disclosure will be described with reference to the accompanying drawings, wherein like numbers reference like elements.

FIG. 5C is a graph showing a plurality of examples of a relationship between an axis-direction distance and a proportion of a hole with a groove with.

DESCRIPTION OF EMBODIMENTS

Hereinafter, a rotary machine according to embodiments of the disclosure will be described with reference to the drawings.

First Embodiment

Rotary Machine

Figure 1:
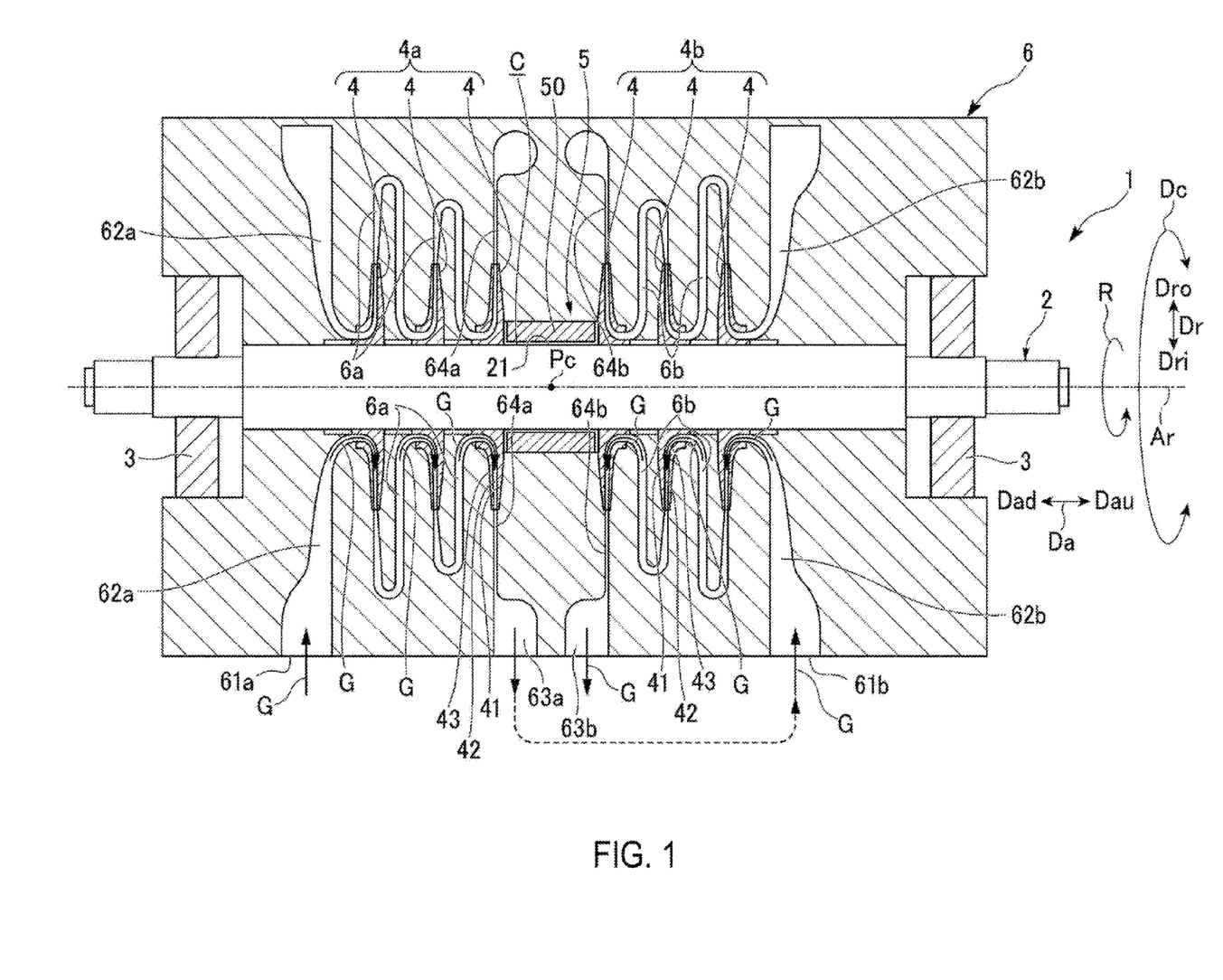
FIG. 1 is a cross-sectional view illustrating a schematic configuration of a rotary machine according to an embodiment of the disclosure.

The rotary machine according to the present embodiment is a multistage centrifugal compressor including a plurality of impellers. As illustrated in FIG. 1, a rotary machine 1 includes a rotor shaft 2, a bearing 3, an impeller 4, a casing 6, and a sealing device 5.

Rotor Shaft

The rotor shaft 2 is a columnar member centered on an axis Ar extending in a horizontal direction. Here, the direction in which the axis Ar extends (left-right direction in FIG. 1) is referred to as "axis direction Da", the circumferential direction of the rotor shaft 2 is simply referred to as "circumferential direction Dc", and the radial direction of the rotor shaft 2, which is a direction perpendicular to the axis Ar, is simply referred to as "radial direction Dr".

Of both sides in the axis direction Da, one side (right side in FIG. 1) is simply referred to as "one side Dau", and the opposite side (left side in FIG. 1) is referred to as the "other side Dad". A side approaching the axis Ar in the radial direction Dr of the rotor shaft 2 is referred to as "inner side in a radial direction Dri", and its opposite side is referred to as "outer side in a radial direction Dro".

The rotor shaft 2 rotates so as to be switchable between clockwise and counterclockwise about the axis Ar as viewed from the one side Dau. The rotor shaft 2 in the present embodiment rotates counterclockwise about the axis Ar as viewed from the one side Dau. A rotation direction R of the rotor shaft 2 coincides with the circumferential direction Dc.

Bearing

The bearing 3 is a radial bearing that rotatably supports the rotor shaft 2. The bearing 3 in the present embodiment is provided at each of the both end portions of the rotor shaft 2 so as to cover the rotor shaft 2 from the outer periphery side.

Impeller

The impeller 4 is a closed impeller that compresses a process gas G (fluid) as a working fluid supplied from the outside to the rotary machine 1 using centrifugal force by rotation of the rotor shaft 2.

A plurality of the impellers 4 are attached to the rotor shaft 2 between the bearings 3 arranged on both sides of the rotor shaft 2 in the axis direction Da. In the present embodiment, the six impellers 4 are attached to the rotor shaft 2 so as to be aligned in the axis direction Da.

These impellers 4 constitute a first impeller group 4a and a second impeller group 4b in which the orientations of blades 42 are opposite to each other in the axis direction Da. Each of the impellers 4 includes a disk 41, the blade 42, and a cover 43.

The disk 41 is formed in a disk shape whose diameter gradually increases from a center position Pc of the axis direction Da in the rotor shaft 2 to the outer side in a radial direction Dro. The blade 42 is formed so as to protrude from the disk 41 to the end portion side opposite to the center position Pc in the axis direction Da.

A plurality of the blades 42 are arranged at predetermined intervals in the circumferential direction Dc of the rotor shaft 2. The cover 43 covers the plurality of blades 42 from the end portion side in the axis direction Da. The cover 43 is formed in a disk shape facing the disk 41.

Each of the first impeller group 4a and the second impeller group 4b includes three impellers 4. That is, the first impeller group 4a and the second impeller group 4b are a three-stage impeller group that compresses the process gas G in three stages.

In each of the first impeller group 4a and the second impeller group 4b, the pressure of the process gas G on the center position Pc side of the axis direction Da becomes the highest. That is, the process gas G flows while being compressed stepwise toward the center position Pc by the impellers 4 of the first impeller group 4a and the second impeller group 4b.

Casing

The casing 6 supports the bearing 3 and covers the rotor shaft 2, the impeller 4, and the sealing device 5 from the outer periphery side. The casing 6 is formed in a tubular shape. The casing 6 is supported by, for example, a casing support portion or the like (not illustrated) fixed to the ground, a frame, or the like.

The casing 6 includes an intake port 61a on the other side Dad. The intake port 61a is connected to an intake flow path 62a formed in an annular shape. The intake flow path 62a is connected to a flow path of the impeller 4 located at the most other side Dad of the first impeller group 4a. That is, the process gas G flowing in from the intake port 61a is introduced into the first impeller group 4a through the intake flow path 62a and sequentially compressed.

The casing 6 includes a casing flow path 6a that connects flow paths formed between the blades 42 of each of the impellers 4. The casing 6 includes a discharge port 63a on the center position Pc side of the axis direction Da. This discharge port 63a is connected to a discharge flow path 64a formed in an annular shape. The process gas G compressed by each of the impellers 4 of the first impeller group 4a is discharged from the discharge port 63a to the outside of the casing 6 through the discharge flow path 64a.

In the casing 6, the first impeller group 4a on the other side Dad and the second impeller group 4b on the one side Dau are formed symmetrically with respect to the center position Pc as a boundary. A casing flow path 6b, an intake port 61b, an intake flow path 62b, a discharge flow path 64b, and a discharge port 63b are formed on one side Dau of the casing 6. The second impeller group 4b located on one side Dau of this casing 6 further compresses the process gas G compressed by the first impeller group 4a on the other side Dad.

That is, the process gas G discharged from the discharge port 63a of the other side Dad relative to the center position Pc is sent to the intake port 61b on the one side Dau of the casing 6. The process gas G flowing in from this intake port 61b is supplied to the second impeller group 4b through the intake flow path 62b and compressed stepwise. The process gas G compressed by the second impeller group 4b is discharged to the outside of the casing 6 from the discharge port 63b on one side Dau relative to the center position Pc through the discharge flow path 64b.

As described above, the process gas G compressed by the first impeller group 4a is introduced into the second impeller group 4b, is further compressed, and reaches near the center position Pc. Therefore, a pressure difference occurs between the first impeller group 4a and the second impeller group 4b.

Specifically, the pressure of the process gas G flowing through the second impeller group 4b is higher than the pressure of the process gas G flowing through the first impeller group 4a. Furthermore, near the center position Pc, clearance C is formed between an outside surface 21 of the rotor shaft 2 and an inside surface 51 of the casing 6.

This leads the process gas G to flow through the clearance C toward the downstream side of the other side Dad on which the first impeller group 4a is arranged, with the one side Dau on which the second impeller group 4b is arranged as the upstream side.

In the present embodiment, for convenience of description, a space through which the process gas G flows in the second impeller group 4b on one side Dau relative to the clearance C is referred to as "high-pressure-side space", and a space through which the process gas G flows in the first impeller group 4a on the other side Dad relative to the clearance C is referred to as "low-pressure-side space".

The sealing device 5 in the present embodiment is arranged near the center position Pc in order to suppress the flow of the process gas G from the second impeller group 4b (high-pressure-side space), which is on the upstream side of the flow of the process gas G in the clearance C, to the first impeller group 4a (low-pressure-side space), which is on the downstream side.

Sealing Device

The sealing device 5 is a hole pattern seal that is provided on the outer periphery side of the rotor shaft 2 and seals the clearance C between the first impeller group 4a and the second impeller group 4b so that the process gas G does not flow through the clearance C. The sealing device 5 includes a sealing main body 50 surrounding the outside surface 21 of the rotor shaft 2 from the outer periphery side. The sealing main body 50 is fixed to the casing 6.

Figure 2:
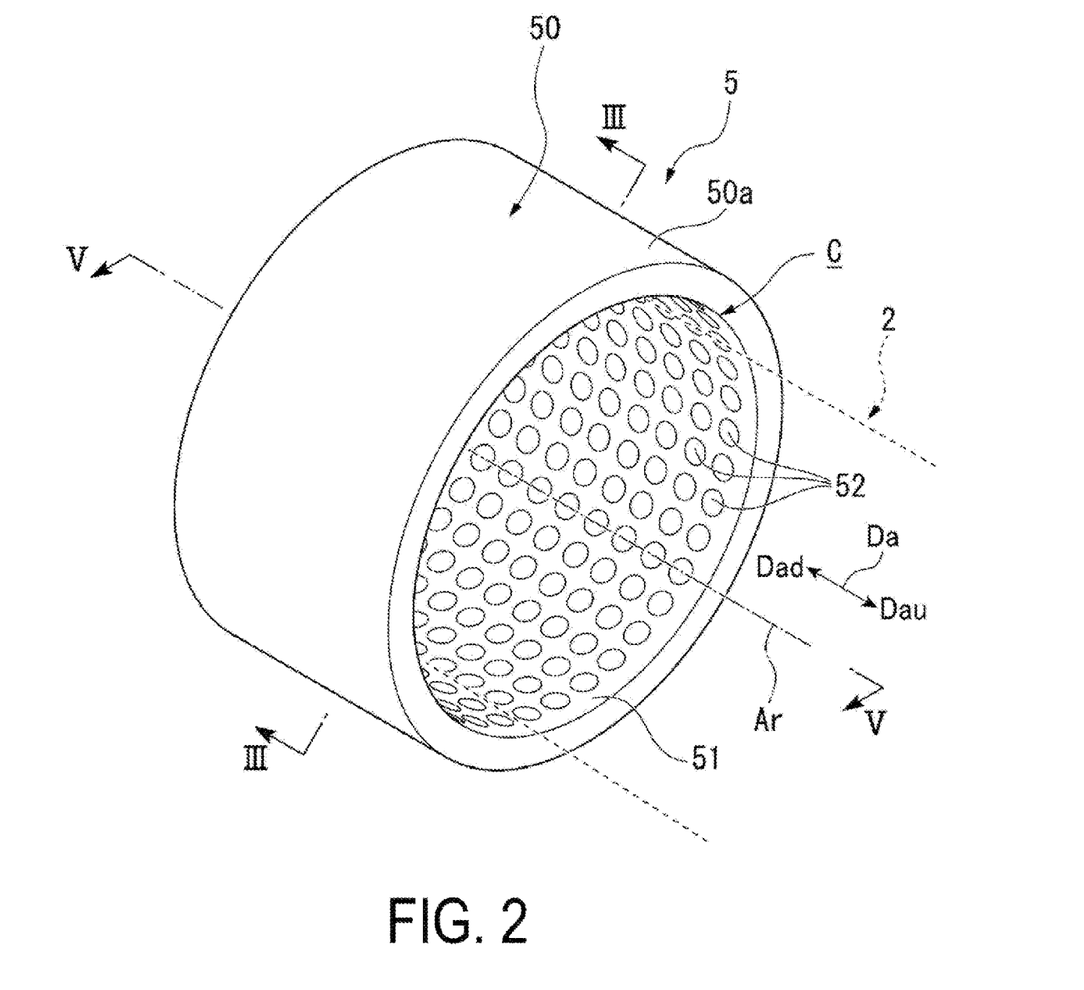
FIG. 2 is a perspective view illustrating a sealing device according to an embodiment of the disclosure.
Figure 3:
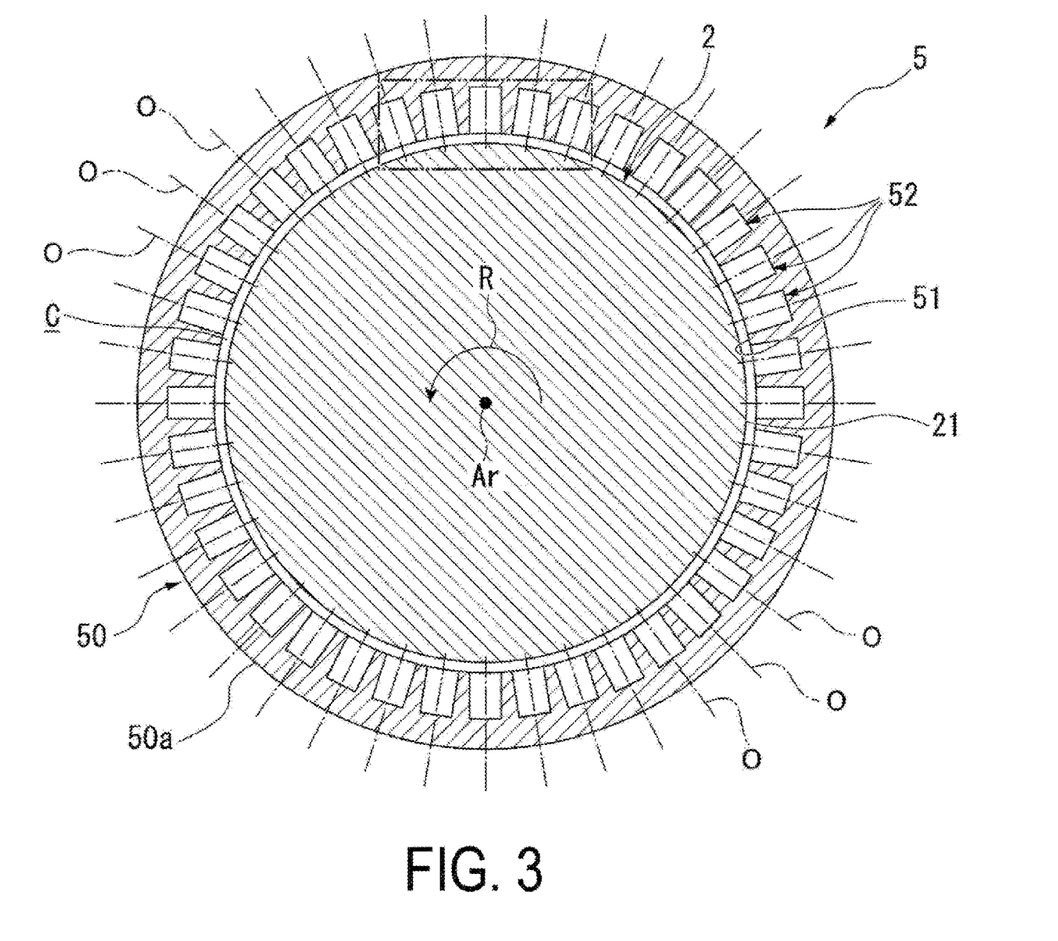
FIG. 3 is a cross-sectional view taken along a line in FIG. 2.

As illustrated in FIG. 2 and FIG. 3, the sealing main body 50 is an annular member having a cylindrical shape. The sealing main body 50 includes the inside surface 51 arranged to oppose the outside surface 21 of the rotor shaft 2 with the clearance C having a predetermined size for rotating the rotor shaft 2, and a plurality of hole parts 52 formed to be recessed on the outer side in a radial direction Dro from the inside surface 51 and arrayed in the circumferential direction Dc of the inside surface 51 and the axis direction Da. The inside surface 51 is a surface having a cylindrical shape.

Figure 4:
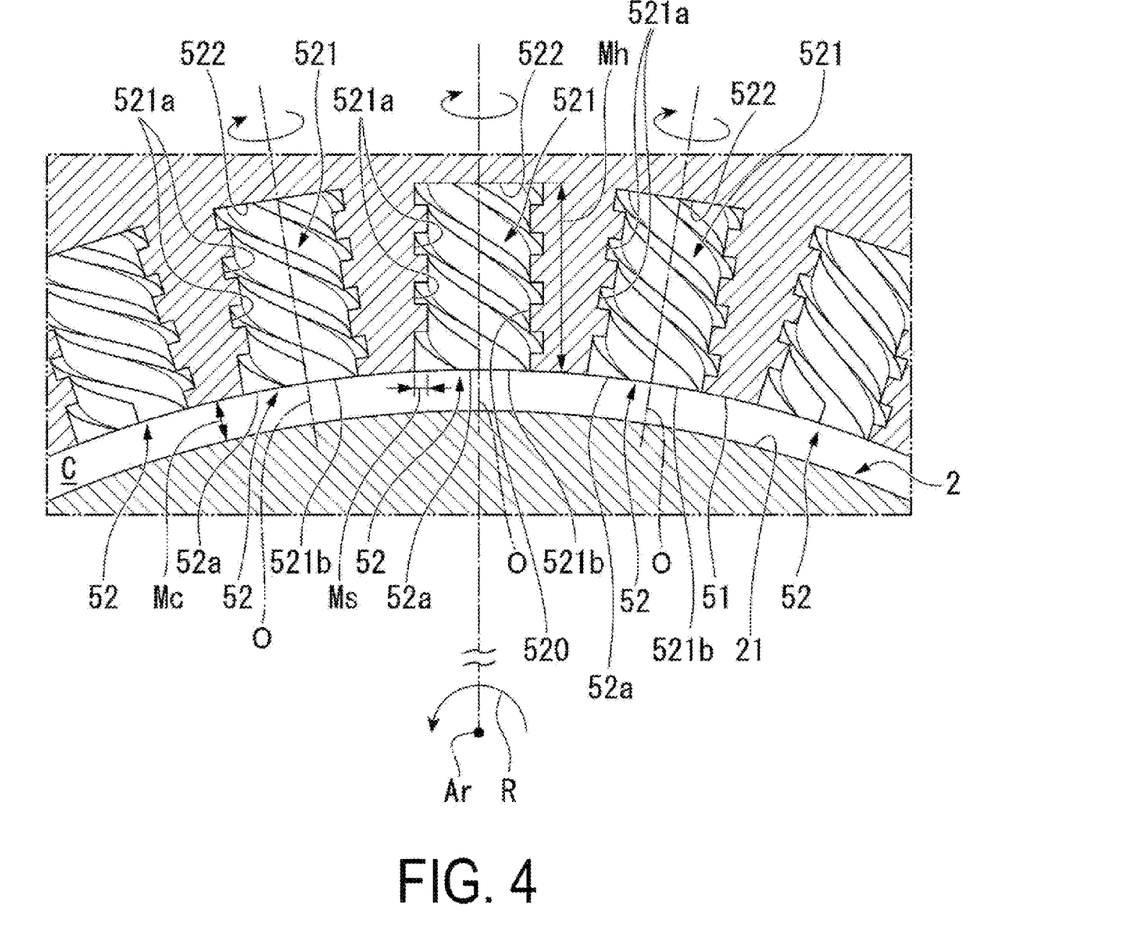
FIG. 4 is an enlarged view of a main part (region surrounded by a long dashed double-dotted line) in FIG. 3 and is a view illustrating a configuration of a hole part according to an embodiment of the disclosure.

As illustrated in FIG. 4, the hole part 52 includes a hole part opening 52a opening so as to oppose the outside surface 21 of the rotor shaft 2, a bottom wall 522 corresponding to a bottom part of the recess, and an inner peripheral wall 520 that connects the hole part opening 52a and the bottom wall 522 and is formed with a spiral groove 521 extending twisting toward the outer side in a radial direction Dro. The hole part openings 52a of the plurality of hole parts 52 are arrayed on the inside surface 51.

The spiral groove 521 extends twisting counterclockwise about a hole part center line O extending in the radial direction Dr in the center of the hole part 52 as viewed from the inner side in a radial direction Dri. The spiral groove 521 of the hole part 52 is a groove into which a multi-thread screw such as a four-thread screw can be screwed.

Here, a groove depth Ms of the spiral groove 521 means a dimension between the inner peripheral wall 520 of the hole part 52 and a groove bottom surface 521a of the spiral groove 521. A depth Mh of the hole part 52 means a dimension between the hole part opening 52a and the bottom wall 522 in the hole part 52. A dimension Mc of the clearance C means a distance between the outside surface 21 of the rotor shaft 2 and the inside surface 51 of the sealing main body 50 when the rotary machine 1 is stopped.

The greater the groove depth Ms of the spiral groove 521 and the depth Mh of the hole part 52 in the present embodiment become, the greater a turning force described later becomes. Therefore, it is desirable to perform optimization in consideration of the man-hours necessary for the process, device dimensions, and the like.

A groove inlet 521b located on the inner side in a radial direction Dri of the spiral groove 521 in the present embodiment is connected to the hole part opening 52a. The groove inlet 521b in the present embodiment is desirably arranged in a part of the one side Dau of the part of the one side Dau and the part of the other side Dad when the hole part opening 52a is divided into two in the axis direction Da.

Operational Effects

In the process gas G, a swirling force (turning direction component) that is a force turning about the axis Ar in the rotation direction R of the rotor shaft 2 with the rotation of the rotor shaft 2 is generated. The process gas G applied with this swirling force flows from the high-pressure-side space into the clearance C between the outside surface 21 of the rotor shaft 2 and the inside surface 51 of the sealing main body 50.

In the sealing device 5 according to the above embodiment, each of the hole parts 52 has the inner peripheral wall 520 in which the spiral groove 521 extending twisting toward the outer side in a radial direction Dro is formed. Therefore, the process gas G flowing into the clearance C from the high-pressure-side space flows into the hole part 52 and flows toward the outer side in a radial direction Dro in the hole part 52 while turning about the hole part center line O along the spiral groove 521.

Due to this, the swirling force of the process gas G flowing into each of the hole parts 52 is converted into a force of turning along the spiral groove 521 in the hole part 52. As a result, the swirling force of the process gas G flowing into the clearance C is reduced, and the excitation force is reduced.

In the rotary machine 1 according to the above embodiment, the rotor shaft 2 rotates counterclockwise about the axis Ar as viewed from the one side Dau, and the spiral groove 521 in the hole part 52 extends twisting counterclockwise about the hole part center line O as viewed from the inner side in a radial direction Dri. Therefore, when the hole part 52 is divided into two in the axis direction Da, a part is generated where the flowing direction of the process gas G flowing along the spiral groove 521 in the hole part 52 on the one side Dau and the flowing direction of the process gas G flowing toward the hole part 52 in the clearance C are aligned. Due to this, the swirling force is more effectively converted into a force of turning along the spiral groove 521.

Second Embodiment

Figure 5A:
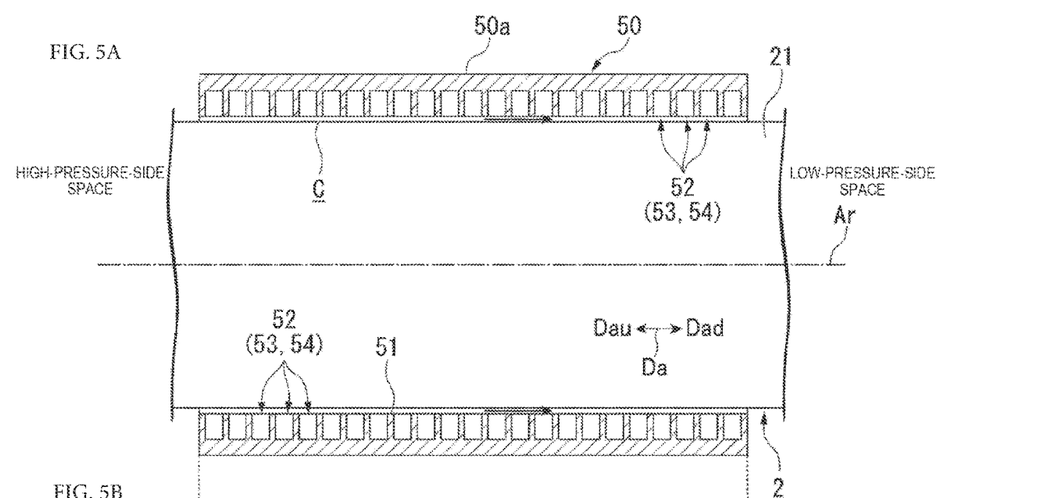
FIG. 5A is a cross-sectional view taken along a line V-V in FIG. 2.

Hereinafter, a rotary machine according to a second embodiment of the disclosure will be described with reference to FIG. 5. The sealing device described in the second embodiment is partially different in configuration from the sealing device 5 of the first embodiment. Components similar to those in the first embodiment are denoted by the same reference signs, and detailed description will be omitted.

Sealing Device

The plurality of hole parts 52 in the present embodiment include a plurality of holes with a groove 53 having the inner peripheral wall 520 in which the spiral groove 521 extending twisting toward the outer side in a radial direction Dro is formed, and a plurality of holes without a groove 54 having the inner peripheral wall 520 in which the spiral groove 521 is not formed.

Figure 5B:
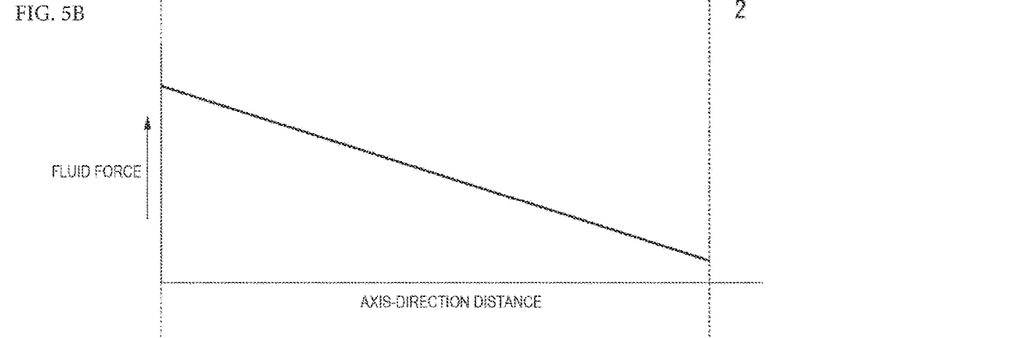
FIG. 5B is a graph showing, as an example, a relationship between an axis-direction distance and a fluid force.
Figure 5C:
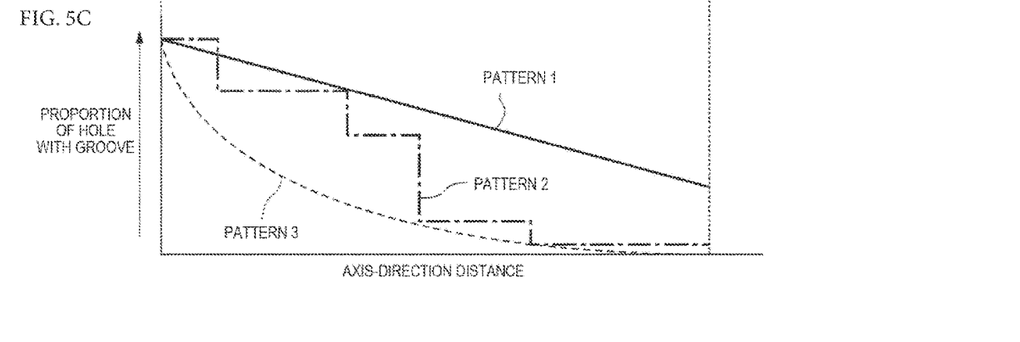

Specifically, the proportion of the plurality of holes with a groove 53 in the plurality of hole parts 52 arrayed in the circumferential direction Dc of the inside surface 51 as illustrated in FIG. 5C on the basis of the distribution of the fluid force of the process gas G illustrated in FIG. 5B as an example may become high toward the high-pressure-side space. For example, when the fluid force of the process gas G decreases from the high-pressure-side space toward the low-pressure-side space, the proportion of the plurality of holes with a groove 53 in the plurality of hole parts 52 arrayed in the circumferential direction Dc of the inside surface 51 may decrease from the high-pressure-side space toward the low-pressure-side space. Hereinafter, the proportion of the plurality of holes with a groove 53 in the plurality of hole parts 52 arrayed in the circumferential direction Dc of the inside surface 51 is referred to as "proportion of holes with a groove 53" for convenience of description.

At this time, the proportion of the holes with a groove 53 may be changed as in any of a pattern 1, a pattern 2, and a pattern 3 illustrated in FIG. 5C. For example, as illustrated in the pattern 1, the proportion of the holes with a groove 53 may linearly decrease from the high-pressure-side space toward the low-pressure-side space. As illustrated in the pattern 2, the proportion of the holes with a groove 53 may decrease stepwise from the high-pressure-side space toward the low-pressure-side space. As illustrated in the pattern 3, the proportion of the holes with a groove 53 may decrease exponentially.

Here, the fluid force of the process gas G means the swirling force (turning direction component) that is the force with which the process gas G turns in the clearance C about the axis Ar in the rotation direction R of the rotor shaft 2 with the rotation of the rotor shaft 2.

Operational Effects

In the rotary machine 1 according to the above embodiment, the proportion of the plurality of holes with a groove 53 in the plurality of hole parts 52 arrayed in the circumferential direction Dc of the inside surface 51 becomes high only in a region where the fluid force is large. In the region where the fluid force is large, the excitation force suppressing effect of the hole part 52 is enhanced, and therefore the hole with a groove 53 formed in the sealing main body 50 can be concentrated only in the effective region. Therefore, it is possible to reduce the man-hours necessary for the process and the cost necessary for construction in forming the hole part 52 in the sealing main body 50 without significantly reducing the excitation force reducing effect.

Other Embodiments

The embodiments of the disclosure have been described above in detail with reference to the drawings. However, specific configurations are not limited to the configurations of the embodiments. Any configuration can be added, omitted, substituted, or otherwise modified, as long as such addition, omission, substitution, or modification does not depart from the scope of the disclosure.

Figure 6:
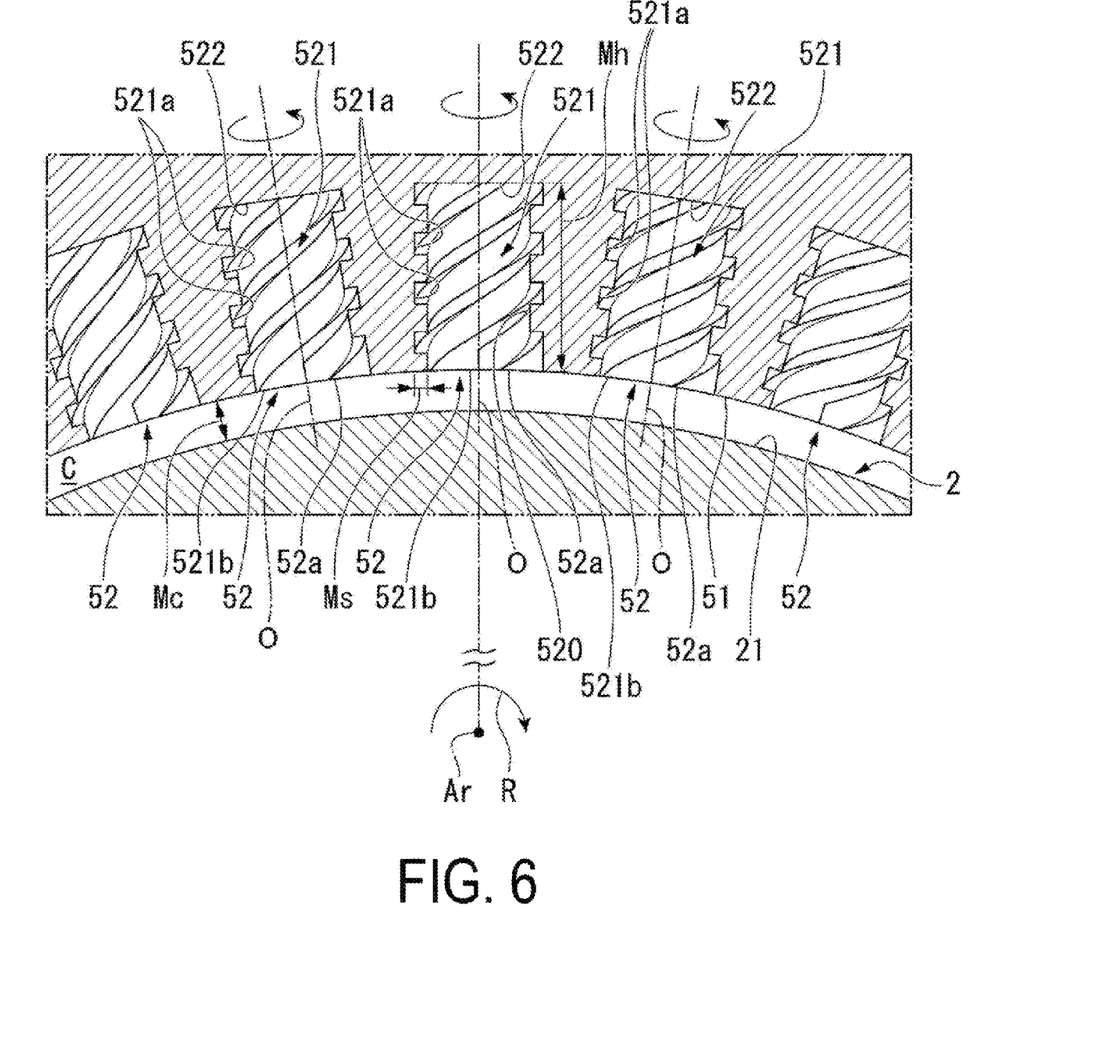
FIG. 6 is a view illustrating a configuration of a hole part according to another embodiment of the disclosure.

The rotor shaft 2 may rotate clockwise about the axis Ar as viewed from the one side Dau. At this time, as illustrated in FIG. 6, each of the spiral grooves 521 in the plurality of hole parts 52 formed in the sealing main body 50 extends twisting clockwise about the hole part center line O as viewed from the inner side in a radial direction Dri.

Due to this, a place is generated where the direction in which the process gas G flows along each of the spiral grooves 521 in the one side Dau in the half of all the hole parts 52 and the direction in which the process gas G flows toward the hole part 52 in the clearance C are aligned.

Figure 7A:
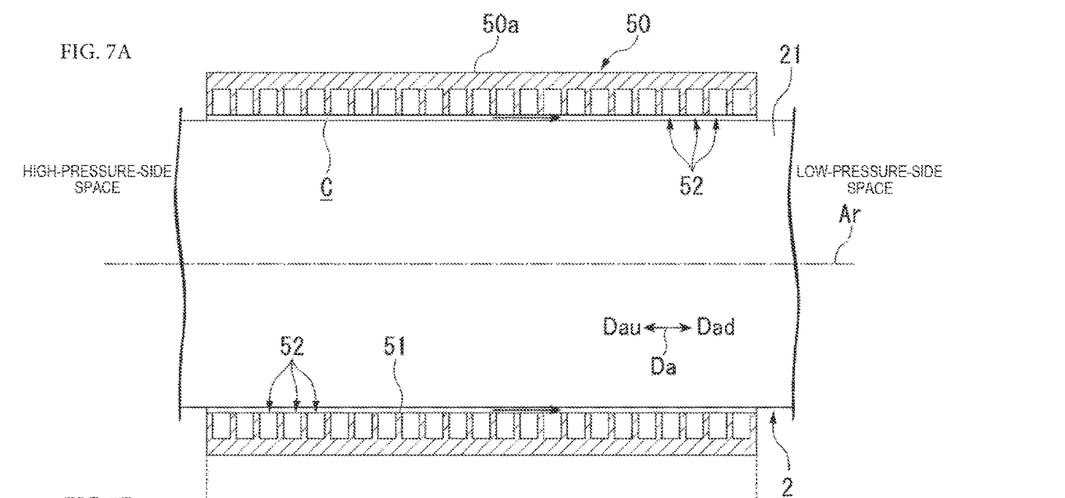
FIG. 7A is a cross-sectional view taken along the line V-V in FIG. 2.
Figure 7B:
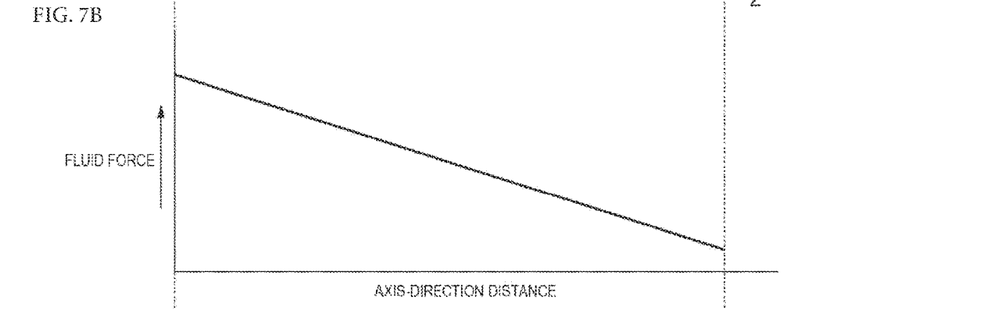
FIG. 7B is a graph showing, as an example, a relationship between an axis-direction distance and a fluid force.
Figure 7C:
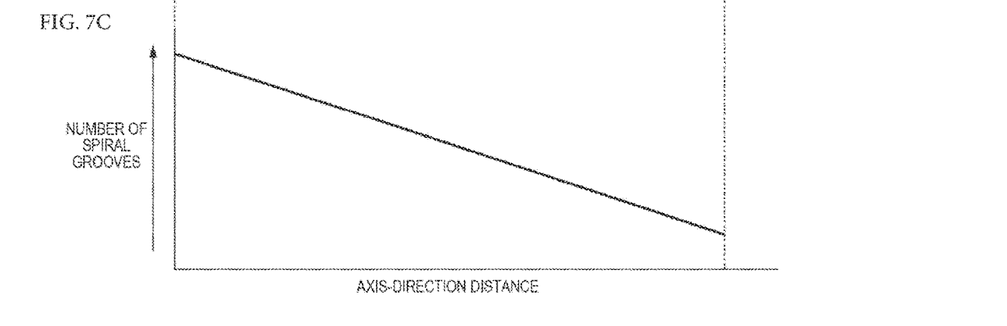
FIG. 7C is a graph showing, as an example, a relationship between an axis-direction distance and the number of spiral grooves.

The number of the spiral grooves 521 (the number of multi-thread screws that can be screwed into the hole parts 52) of the plurality of hole parts 52 in the sealing main body 50 may increase toward the high-pressure-side space. For example, when the fluid force of the process gas G decreases from the high-pressure-side space toward the low-pressure-side space, the number of the spiral grooves 521 of the plurality of hole parts 52 in the sealing main body 50 may decrease from the high-pressure-side space toward the low-pressure-side space. The number of the spiral grooves 521 in the plurality of hole parts 52 may change as illustrated in FIG. 7C along the tendency of the fluid force distribution as illustrated in FIG. 7B as an example.

Figure 8A:
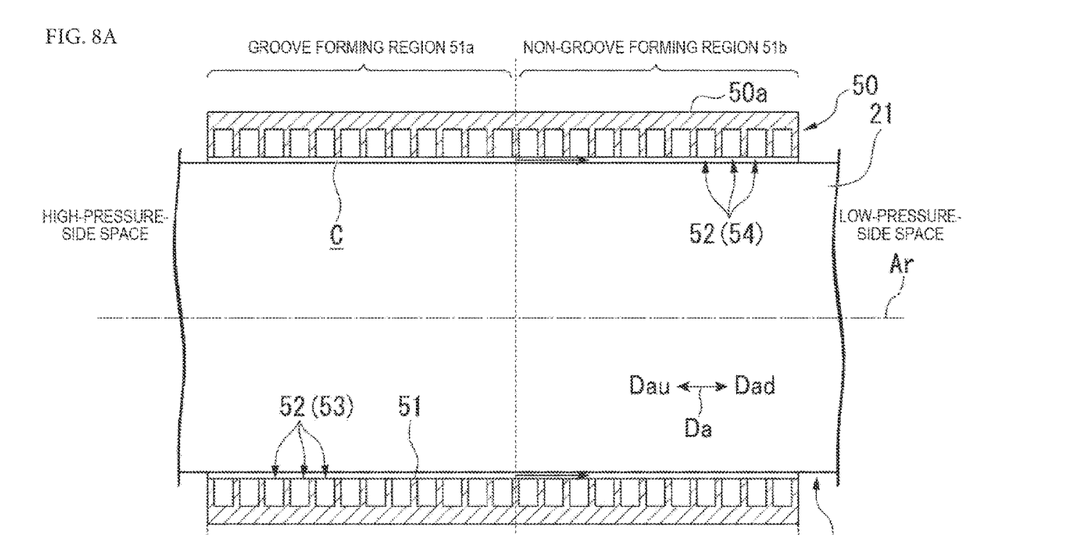
FIG. 8A is a cross-sectional view taken along the line V-V in FIG. 2.
Figure 8B:
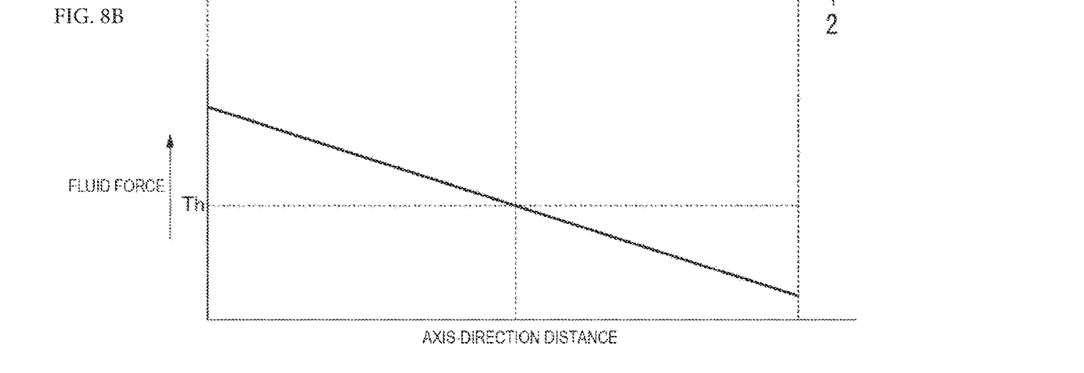
FIG. 8B is a graph showing, as an example, a relationship between an axis-direction distance and a fluid force.

As illustrated in FIG. 8, a region of the inside surface 51 of the sealing main body 50 corresponding to a region where the distribution of the fluid force in the axis direction Da is equal to or greater than a predetermined threshold value Th may be defined as a groove forming region 51a, and a region of the inside surface 51 of the sealing main body 50 corresponding to a region where the distribution of the fluid force is less than the predetermined threshold value Th may be defined as a non-groove forming region 51b. At this time, each of the plurality of hole parts 52 in the groove forming region 51a of the inside surface 51 is only required to be the hole with a groove 53, and each of the plurality of hole parts 52 in the non-groove forming region 51b is only required to be the hole without a groove 54.

This also makes it possible to reduce the number of the holes with a groove 53 formed in the sealing main body 50, and therefore it is possible to reduce the man-hours necessary for the process and the cost necessary for construction in forming the hole part 52 in the sealing main body 50.

Figure 9:
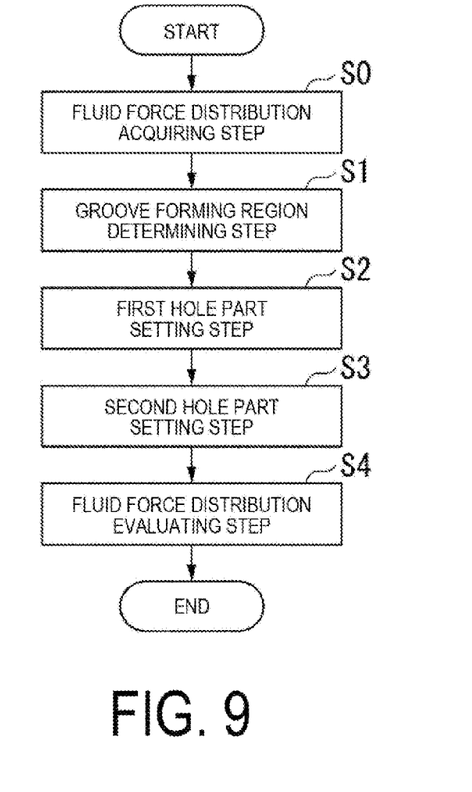
FIG. 9 is a flowchart illustrating a design method for a sealing device according to another embodiment of the disclosure.

Here, a design method for this sealing device 5 will be described. As illustrated in FIG. 9, the design method includes a fluid force distribution acquiring step S0, a groove forming region determining step S1, a first hole part setting step S2, a second hole part setting step S3, and a fluid force distribution evaluating step S4.

The fluid force distribution acquiring step S0 is a step of acquiring a first fluid force distribution (fluid force distribution) in the axis direction Da of the process gas G flowing into the clearance C. Specifically, in the fluid force distribution acquiring step S0, the first fluid force distribution is acquired using CFD analysis or the like.

The groove forming region determining step S1 is a step of dividing the inside surface 51 of the sealing main body 50 into the groove forming region 51a and the non-groove forming region 51b on the basis of the first fluid force distribution acquired in the fluid force distribution acquiring step S0. Specifically, in the groove forming region determining step S1, the fluid force indicated by the first fluid force distribution is compared with the predetermined threshold value Th, and in the fluid force indicated by the first fluid force distribution, the region of the inside surface 51 equal to or greater than the threshold value Th is defined as the groove forming region 51a, and the region of the inside surface 51 less than the threshold value Th is defined as the non-groove forming region 51b.

The first hole part setting step S2 is a step of disposing the plurality of hole parts 52 having the inner peripheral wall 520 in which the spiral groove 521 is formed in the groove forming region 51a. The second hole part setting step S3 is a step of disposing, in the non-groove forming region 51b, the plurality of hole parts 52 having the inner peripheral wall 520 in which the spiral groove 521 is not formed. The order of the first hole part setting step S2 and the second hole part setting step S3 in the manufacturing method may be reversed.

The fluid force distribution evaluating step S4 is a step of analyzing and actually measuring the second fluid force distribution in the axis direction Da of the process gas G flowing into the clearance C in the sealing main body 50 after the second hole part setting step S3. In the fluid force distribution evaluating step S4, the second fluid force distribution is acquired by, for example, disposing, in the clearance C between the outside surface 21 of the rotor shaft 2 and the inside surface 51 of the sealing main body 50, a sensor or the like that can measure a fluid force indicating the pressure of the process gas G. In the fluid force distribution evaluating step S4, it is determined whether or not the second fluid force distribution having been acquired falls within a predetermined target numerical range. In the fluid force distribution evaluating step S4, it may be determined that the sealing main body 50 is a conforming product, for example, when the second fluid force distribution falls within the predetermined numerical range. On the other hand, in the fluid force distribution evaluating step S4, it may be determined that the sealing main body 50 is a non-conforming product, when the second fluid force distribution does not fall within the predetermined numerical range.

Through the above series of steps, the sealing device 5 described with reference to FIG. 8 and FIG. 9 is designed.

The depth Mh of the hole parts 52 arrayed in the circumferential direction Dc on the basis of the fluid force distribution of the process gas G in the circumferential direction Dc of the rotor shaft 2 may be changed.

The impeller 4 is not limited to the three-stage impeller. The impeller 4 is not limited to the closed impeller, and may be an open impeller.

In the embodiments, the configuration in which the sealing device 5 is arranged between the first impeller group 4a and the second impeller group 4b has been described, but the disclosure is not limited to this configuration. The sealing device 5 may be provided in, for example, a cap portion of the inlet of the impeller 4, a balance piston portion provided at the final stage of the multistage impeller, or the like.

The rotary machine 1 is not limited to the multistage centrifugal compressor, and may be, for example, a rotary machine such as an axial flow compressor, a radial flow turbine, an axial flow turbine, various industrial compressors, and a turbo refrigerator.

In the embodiments, the configuration in which the hole part 52 has the hole with a groove 53 on the basis of the fluid force distribution in the axis direction Da, but the disclosure is not limited to the fluid force distribution in the axis direction Da. For example, the hole part 52 may have the groove forming hole 53 on the basis of the fluid force distribution in the circumferential direction Dc. The hole part 52 may have the hole with a groove 53 on the basis of the fluid force distribution in both the axis direction Da and the circumferential direction Dc.

The configuration of the sealing device 5 described in the above embodiments does not remain in an independent configuration, and the sealing device 5 may be configured by appropriately combining the components described in each of the embodiments.

Notes

The sealing device, the rotary machine, and the design method for the sealing device described in the embodiments are understood as follows, for example.

(1) The sealing device 5 according to a first aspect includes the sealing main body 50 surrounding the rotor shaft 2 rotating about the axis Ar from an outer periphery side. The sealing main body 50 includes the inside surface 51 facing the outside surface 21 of the rotor shaft 2 with the clearance C and the plurality of hole parts 52 formed recessed to the outer side in the radial direction Dro from the inside surface 51 and arrayed in the circumferential direction Dc of the inside surface 51 and the axis direction Da. At least some of the hole parts 52 have the inner peripheral wall 520 in which the spiral groove 521 extending twisting toward the outer side in a radial direction Dro is formed.

Due to this, the fluid flowing into the clearance C flows into the hole part 52 and flows toward the outer side in a radial direction Dro while turning in the hole part 52 along the spiral groove 521. As a result, the swirling force of the fluid flowing into each of the hole parts 52 is converted into a force with which the fluid turns in the hole part 52 along the spiral groove 521 in the hole part 52.

(2) The rotary machine 1 according to a second aspect includes the sealing device 5 of (1), the rotor shaft 2, and the casing 6 surrounding the rotor shaft 2 from an outer periphery side and supporting the sealing device 5 that separates a high-pressure-side space on the one side Dau in the axis direction Da from a low-pressure-side space on the other side Dad in the axis direction Da. The rotor shaft 2 rotates counterclockwise or clockwise about the axis Ar as viewed from the one side Dau in the axis direction Da. The spiral groove 521 extends twisting counterclockwise about the hole part center line O extending in the radial direction Dr at a center of the hole part 52 as viewed from the inner side in a radial direction Dri when the rotor shaft rotates counterclockwise. The spiral groove extends twisting clockwise about the hole part center line O extending in the radial direction Dr at a center of the hole part 52 as viewed from the inner side in the radial direction Dri when the rotor shaft rotates clockwise.

Due to this, when the hole part 52 is divided into two in the axis direction Da, a part is generated where the direction in which the fluid flows along the spiral groove 521 in the hole part 52 on the one side Dau and the direction in which the fluid flows toward the hole part 52 in the clearance C are aligned.

(3) The rotary machine 1 according to a third aspect includes the sealing device 5 including the sealing main body 50 surrounding the rotor shaft 2 rotating about the axis Ar from an outer periphery side, the rotor shaft 2, and the casing 6 surrounding the rotor shaft 2 from an outer periphery side and supporting the sealing device 5 that separates a high-pressure-side space on the one side Dau in the axis direction Da from a low-pressure-side space on the other side Dad in the axis direction Da. The sealing main body 50 includes the inside surface 51 facing the outside surface 21 of the rotor shaft 2 with the clearance C and the plurality of hole parts 52 formed recessed on the outer side in a radial direction Dro from the inside surface 51 and arrayed in the circumferential direction Dc of the inside surface 51 and in the axis direction Da. The plurality of hole parts 52 includes the plurality of holes with a groove 53 having the inner peripheral wall 520 in which the spiral groove 521 extending twisting toward the outer side in a radial direction Dro is formed and the plurality of holes without a groove 54 having the inner peripheral wall 520 in which the spiral groove 521 is not formed. A proportion of the plurality of holes with a groove 53 to the plurality of hole parts 52 arrayed in the circumferential direction Dc of the inside surface 51 increases toward the high-pressure-side space side.

This can reduce the number of the holes with a groove 53 formed in the sealing main body 50.

(4) The design method for the sealing device 5 according to a fourth aspect is a method for designing the sealing device 5 including the sealing main body 50 that surrounds the rotor shaft 2 rotating about the axis Ar from an outer periphery side and includes the inside surface 51 facing the outside surface 21 of the rotor shaft 2 with the clearance C and the plurality of hole parts 52 formed recessed on the outer side in a radial direction Dro from the inside surface 51 and arrayed in the circumferential direction Dc of the inside surface 51 and the axis direction Da. The design method includes the fluid force distribution acquiring step S0 of acquiring a fluid force distribution of fluid flowing into the clearance C from the axis direction Da, the groove forming region determining step S1 of dividing the inside surface 51 into the groove forming region 51*a* and the non-groove forming region 51*b* in accordance with the fluid force distribution, the first hole part setting step S2 of disposing, in the groove forming region 51*a*, the plurality of hole parts 52 having the inner peripheral wall 520 in which the spiral groove 521 extending twisting toward the outer side in a radial direction Dro is formed, and the second hole part setting step S3 of disposing, in the non-groove forming region 51*b*, the plurality of hole parts 52 having the inner peripheral wall 520 in which the spiral groove 521 is not formed.

This can reduce the number of the hole parts 52 in which the spiral groove 521 is formed among the plurality of hole parts 52.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A sealing device, comprising:
a sealing main body surrounding a rotor shaft rotating about an axis from an outer periphery side,
the sealing main body including:
an inside surface facing an outside surface of the rotor shaft with clearance; and
a plurality of hole parts formed recessed to an outer side in a radial direction from the inside surface and arrayed in a circumferential direction of the inside surface and in a direction of the axis, wherein
at least some of the hole parts have an inner peripheral wall in which a spiral groove extending twisting toward the outer side in a radial direction is formed.

2. A rotary machine, comprising:
the sealing device according to claim 1;
the rotor shaft; and
a casing surrounding the rotor shaft from an outer periphery side and supporting the sealing device that separates a high-pressure-side space on one side in the direction of the axis from a low-pressure-side space on another side in the direction of the axis, wherein
the rotor shaft rotates counterclockwise about the axis as viewed from the one side in the direction of the axis, and
the spiral groove extends twisting counterclockwise about a hole part center line extending in the radial direction at a center of each of the hole parts as viewed from an inner side in the radial direction.

3. A rotary machine, comprising:
the sealing device according to claim 1;
the rotor shaft; and
a casing surrounding the rotor shaft from an outer periphery side and supporting the sealing device that separates a high-pressure-side space on one side in the direction of the axis from a low-pressure-side space on another side in the direction of the axis, wherein
the rotor shaft rotates clockwise about the axis as viewed from the one side in the direction of the axis, and
the spiral groove extends twisting clockwise about a hole part center line extending in the radial direction at a center of each of the hole parts as viewed from an inner side in the radial direction.

4. A rotary machine, comprising:
a sealing device including a sealing main body surrounding a rotor shaft rotating about an axis from an outer periphery side; and
a casing surrounding the rotor shaft from an outer periphery side and supporting the sealing device that separates a high-pressure-side space on one side in the direction of the axis from a low-pressure-side space on another side in the direction of the axis,
the sealing main body including:
an inside surface facing an outside surface of the rotor shaft with clearance; and
a plurality of hole parts formed recessed to an outer side in a radial direction from the inside surface and arrayed in a circumferential direction of the inside surface and in a direction of the axis,
the plurality of hole parts including:
a plurality of holes with a groove having an inner peripheral wall in which a spiral groove extending twisting toward the outer side in the radial direction is formed; and
a plurality of holes without a groove having an inner peripheral wall in which the spiral groove is not formed, wherein a proportion of the plurality of holes with a groove to the plurality of hole parts arrayed in the circumferential direction of the inside surface increases toward the high-pressure-side space side.

5. A method for manufacturing a sealing device including a sealing main body that surrounds a rotor shaft rotating about an axis from an outer periphery side and includes an inside surface facing an outside surface of the rotor shaft with clearance and a plurality of hole parts formed recessed to an outer side in a radial direction from the inside surface and arrayed in a circumferential direction of the inside surface and in a direction of the axis, the design method comprising:

- a fluid force distribution acquiring step of acquiring a fluid force distribution of fluid flowing into the clearance from the direction of the axis;
- a groove forming region determining step of dividing the inside surface into a groove forming region and a non-groove forming region in accordance with the fluid force distribution;
- a first hole part setting step of disposing, in the groove forming region, the plurality of hole parts having an inner peripheral wall in which a spiral groove extending twisting toward the outer side in the radial direction is formed; and
- a second hole part setting step of disposing, in the non-groove forming region, the plurality of hole parts having an inner peripheral wall in which the spiral groove is not formed.

* * * * *